United States Patent [19]

Gnad

[11] 4,133,806
[45] Jan. 9, 1979

[54] AZO DYES WITH AN N-SUBSTITUTED 2-HYDROXY-3-CYANO-4-METHYL PYRRIDONE-6-COUPLING COMPONENT

[75] Inventor: Gerhard Gnad, Ludwigshafen, Fed. Rep. of Germany

[73] Assignee: BASF Aktiengesellschaft, Ludwigshafen, Fed. Rep. of Germany

[21] Appl. No.: 475,491

[22] Filed: Jun. 3, 1974

Related U.S. Application Data

[63] Continuation of Ser. No. 25,253, Apr. 2, 1970, abandoned.

[30] Foreign Application Priority Data

Apr. 3, 1969 [DE] Fed. Rep. of Germany ....... 1917278

[51] Int. Cl.$^2$ .................. C09B 29/36; D06P 1/18; D06P 3/26; D06P 3/54
[52] U.S. Cl. ................................... 260/156; 546/288
[58] Field of Search ............................... 260/156

[56] References Cited

U.S. PATENT DOCUMENTS

| 3,487,066 | 12/1969 | Ritter et al. ............................ 260/156 |
| 3,640,674 | 2/1972 | Berrie et al. ....................... 260/156 X |

Primary Examiner—Floyd D. Higel
Attorney, Agent, or Firm—Keil, Thompson & Shurtleff

[57] ABSTRACT

Azo dyes represented by the formula

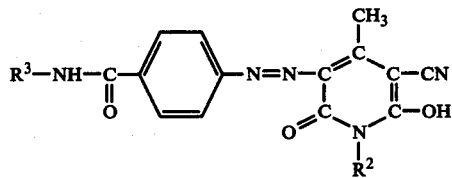

in which $R^2$ represents alkyl of 1 to 4 carbon atoms or may also represent ethyl or propyl substituted by hydroxy or alkoxy of 1 to 4 carbon atoms, and $R^3$ is $C_4H_9$—, $CH_3OCH_2CH_2$—, $CH_3(CH_2)_4$—, $CH_3(CH_2)_5$—, $CH_3(CH_2)_7$—,

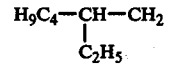

or cycloalkyl of 5 to 8 carbon atoms. These dyes have excellent fastness properties and are especially useful for dyeing cellulose ester and polyester fibrous materials.

4 Claims, No Drawings

AZO DYES WITH AN N-SUBSTITUTED 2-HYDROXY-3-CYANO-4-METHYL PYRRIDONE-6-COUPLING COMPONENT

This is a continuation of application Ser. No. 25,253, filed Apr. 2, 1970 (now abandoned).

The invention relates to dyes having the general formula (I):

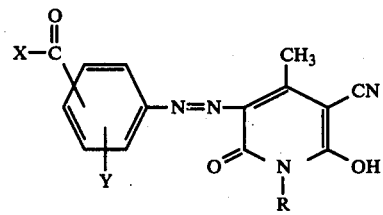

where
- X denotes an alkoxy radical having three to eight carbon atoms, an ethoxy, ethoxyethoxy or propoxy radical bearing, as substituents, hydroxy, cyano, methoxy, ethoxy, propoxy, butoxy or acetoxy, a hydroxybutoxy radical, a hydroxyhexoxy radical, a radical having the formula $(OCH_2CH_2)_3OH$, $(OCH_2CH_2)_3OCH_3$ or $(OCH_2CH_2)_3OC_2H_5$, a cyclohexoxy radical, benzyloxy radical, phenoxy radical, an amido group, an N-monosubstituted amido group or an N,N-disubstituted amido group;
- Y denotes a hydrogen, chlorine or bromine atom or a nitro or cyano group or a radical having the formula —COX;
- Y and the radical together may denote a radical which is attached in orthoposition and which has the formula:

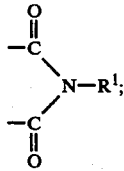

$R^1$ denotes a hydrogen atom, an alkyl group having one to eight carbon atoms which may bear a hydroxy, methoxy or ethoxy group as a substituent, a phenyl group or a tolyl group;

R denotes an alkyl group having one to four carbon atoms, an alkyl group having two to four carbon atoms which bears an —OH, —$OCH_3$ or —$OC_2H_2$ group as a substituent, a benzyl group, phenylethyl group, phenyl group, tolyl group, 2-methoxyphenyl group, 3-methoxyphenyl group, 4-methoxyphenyl group, 2-chlorophenyl group, 3-chlorophenyl group, 4-chlorophenyl group, 2-hydroxyphenyl group, or 3-hydroxyphenyl group.

Carbalkoxy radicals as substituents for the diazo components may contain for example the following alcohol components: propanol, butanol, isobutanol, hexanol, ethylhexanol, cyclohexanol, benzyl alcohol, phenol, β-hydroxyethanol, β-methoxyethanol, β-ethoxyethanol or β-butoxyethanol or the compounds having the formulae: HO—$(CH_2CH_2O)_2CH_3$, $HO(CH_2CH_2O)_2C_2H_5$, $HO(CH_2CH_2O)_3CH_3$, $HO(CH_2CH_2O)_2C_2H_5$ and $HOCH_2CH_2OCOCH_3$, and the compounds β-hydroxypropanol, γ-hydroxypropanol, δ-hydroxybutanol and ω-hydroxyhexanol.

The following are examples of N monosubstituted or N,N disubstituted carbamoyl radicals:

N methylamide, N-ethylamide, N-butylamide, N-cyclohexylamide, N-(β-ethylhexyl)amide, N-β-hydroxyethylamide, N-β-methoxyethylamide, N-β-hydroxypropylamide, N-γ-hydroxypropylamide, N-γ-methoxypropylamide, N-γ-ethoxypropylamide, N,N-dimethylamide, N,N-diethylamide, N,N-dipropylamide, N-methyl-N-β-hydroxyethylamide, pyrrolidide or morpholide.

The following aniline derivatives are given as examples of diazo components: the propyl, butyl, isobutyl, β-ethylhexyl, cyclohexyl, benzyl, phenyl, β-methoxyethyl, β-ethoxyethyl, β-butoxyethyl, methyldiglycol, ethyldiglycol, methyltriglycol, ethyltriglycol, β-hydroxyethyl, β-acetoxyethyl, β-(β'-hydroxyethoxy)ethyl, β-hydroxyethyl, γ-hydroxypropyl, δ-hydroxybutyl or ω-hydroxyhexyl esters of 2-aminobenzoic, 3-aminobenzoic and 4-aminobenzoic acids, the methyl, isobutyl and methyldiglycol esters of 4-nitroanthranilic acid, the dipropyl, dibutyl, diisobutyl, dimethylglycol, diethylglycol, dimethyldiglycol, diethyldiglycol and dibenzyl esters of 3-aminophthalic, 4-aminophthalic, 5-aminoisophthalic and aminoterephthalic acids.

The following may also be referred to:
the amides, methylamides, propylamides, n-butylamides, isobutylamides, cylcohexylamides, methoxypropylamides, ethoxypropylamides, β-hydroxylethylamides and anilides of 3-aminobenzoic acid and 4-aminobenzoic acid, the dimethylamides, diethylamides, di-n-propylamides, pyrrolidides, morpholides and N-methyl-N-β-hydroxyethylamides of 2-aminobenzoic, 3-aminobenzoic and 4-aminobenzoic acids, the diamide, dimethylamide, dimethoxypropylamide or di-n-butylamide of 5-aminoisophthalic acid, the bis-dimethylamides or bis-diethylamides of 5-aminoisophthalic or aminoterephthalic acid, and the imides, β-hydroxyethylimides, γ-hydroxypropylimides, methylimides, n-butylimides, γ-methoxypropylimides or phenylimides of 3-aminophthalic acid and 4-aminophthalic acid.

Industrially preferred dyes are obtained with diazo components which have been derived from anilines preferably having a monosubstituted amide group.

Examples of radicals R in the dyes having the general formula are: methyl, ethyl, propyl, n-butyl, isobutyl, β-methoxyethyl, γ-methoxypropyl, β-hydroxyethyl, β-hydroxypropyl, γ-hydroxypropyl, γ-ethoxypropyl, γ-dimethylaminopropyl, benzyl, phenylethyl, phenyl, tolyl, 2-methoxyphenyl, 3-methoxyphenyl, 4-methoxyphenyl, 2-chlorophenyl, 3-chlorophenyl, 4-chlorophenyl, 2-hydroxyphenyl, 3-hydroxyphenyl or 4-hydroxyphenyl.

Preferred radicals R are alkyl groups having one to four carbon atoms which may bear hydroxy or alkoxy groups having one to four carbon atoms as substituents.

Among the group of preferred dyes, the compounds having the formula:

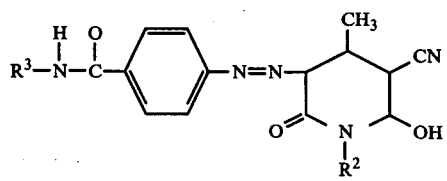

have particular technical significance; in these compounds $R^2$ denotes an alkyl radical having one to four carbon atoms; or an ethyl or propyl radical bearing a hydroxy, methoxy, propoxy, ethoxy or butoxy group as substituent; and $R^3$ denotes an alkyl radical having one to eight carbon atoms bearing hydroxy or alkoxy having one to four carbon atoms as substituents or a five-membered to eight-membered cycloalkyl radical.

Examples of preferred dyes are the following.

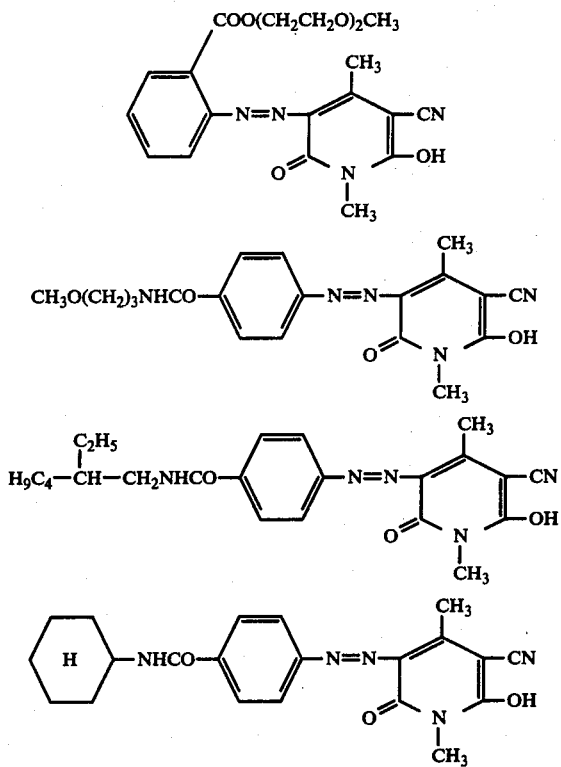

The new dyes are yellow and give greenish yellow to orange dyeings having excellent fastness properties on synthetic fibrous material such as polyamides, polyacrylontrile and particularly on cellulose esters and polyesters. The fastness to light and dry-heat pleating and setting are particularly good.

For the production of the new dyes, diazo compounds of amines having the general formula

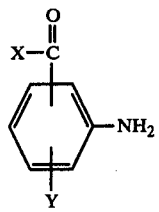

may be reacted with coupling components having the general formula:

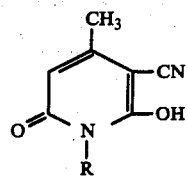

Coupling is carried out as usual in an aqueous medium with or without the addition of solvents at a weakly acid to alkaline pH.

The invention is illustrated by the following Examples. References to parts and percentages in the following Examples relate to weight unless otherwise stated.

EXAMPLE 1

160 parts of ice is added to a solution of 17.9 parts of propyl-2-aminobenzoate in 160 parts of water and 25 parts by volume of concentrated hydrochloric acid and then 30 parts by volume of 23% sodium nitrite solution is allowed to flow in at 0° to 5° C. The whole is stirred at the same temperature for another two hours and any excess of nitrous acid present is then removed as usual. The diazo solution is added in portions to a solution of 22.9 parts of N-γ-methoxypropyl-2-hydroxy-3-cyano-4-methylpyridone-(6), 5 parts of sodium hydroxide and 10 parts of sodium carbonate in 300 parts by volume of water with an addition of 200 parts of ice. When coupling is over, the deposited dye having the formula:

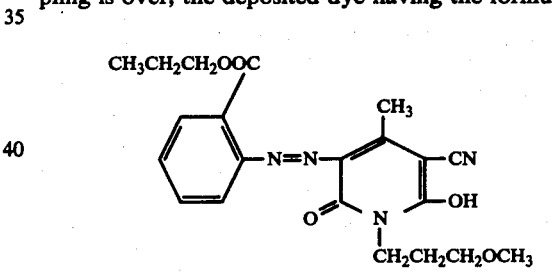

is suction filtered, washed with water and dried. It is obtained in the form of a yellow powder which dissolves in dimethylformamide with a yellow color.

100 parts of polyethylene terephthalate cloth is dyed in a dye liquor containing 1 part of the finely divided dye thus obtained, 2 parts of the sulfonated adduct of 80 moles of ethylene oxide to 1 mole of sperm oil alcohol and 2,000 parts of water for sixty minutes at 120° C. in a pressure apparatus. A pure greenish yellow dyeing is obtained which has good thermal resistance and outstanding fastness to light.

Using the diazo components and coupling components set out in the following Table, dyes having similar tinctorial properties are obtained by analogous methods.

In the following Examples 2 to 77, the dyeings on polyester in Examples 50, 51, 54 55 and 58 are yellow and those in all the other Examples are greenish yellow.

| Example | Diazo component | Coupling component |
|---|---|---|
| 2 | 2-NH₂-C₆H₄-COOC₃H₇ | 4-methyl-3-cyano-6-hydroxy-1-methyl-2-oxo-pyridine (N-CH₃) |
| 3 | " | 4-methyl-3-cyano-6-hydroxy-1-(n-C₃H₇)-2-oxo-pyridine |
| 4 | " | 4-methyl-3-cyano-6-hydroxy-1-(n-C₄H₉)-2-oxo-pyridine |
| 5 | " | 4-methyl-3-cyano-6-hydroxy-1-(CH₂CH₂OH)-2-oxo-pyridine |
| 6 | " | 4-methyl-3-cyano-6-hydroxy-1-(4-methoxyphenyl)-2-oxo-pyridine |
| 7 | " | 4-methyl-3-cyano-6-hydroxy-1-(4-chlorophenyl)-2-oxo-pyridine |
| 8 | " | 4-methyl-3-cyano-6-hydroxy-1-phenyl-2-oxo-pyridine |
| 9 | 2-NH₂-C₆H₄-COOC₄H₉(i) | 4-methyl-3-cyano-6-hydroxy-1-methyl-2-oxo-pyridine |

-continued
| Example | Diazo component | Coupling component |
|---|---|---|
| 10 | " | 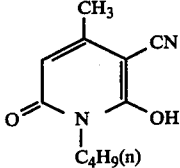 |
| 11 | " | 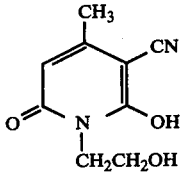 |
| 12 | " | 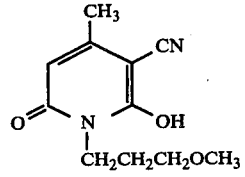 |
| 13 | 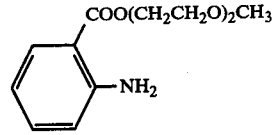 | 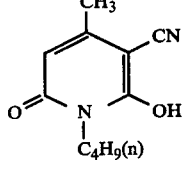 |
| 14 | 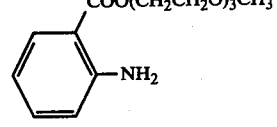 | 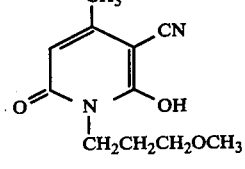 |
| 15 | " | 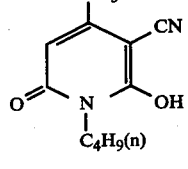 |
| 16 | " | 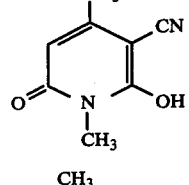 |
| 17 | 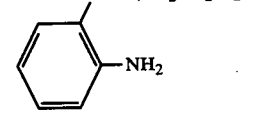 | 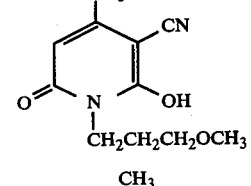 |
| 18 | 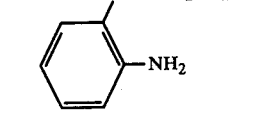 | 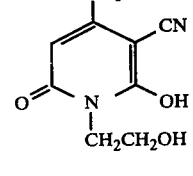 |

-continued

| Example | Diazo component | Coupling component |
|---|---|---|
| 19 | " | 3-cyano-4-methyl-6-hydroxy-1-(3-methoxypropyl)-2-pyridone |
| 20 | 2-amino-benzoic acid di(ethyleneglycol)monomethyl ether ester [COO(CH$_2$CH$_2$O)$_2$CH$_3$, NH$_2$] | " |
| 21 | " | 3-cyano-4-methyl-6-hydroxy-1-methyl-2-pyridone |
| 22 | 2-amino-benzoic acid tri(ethyleneglycol)monomethyl ether ester [COO(CH$_2$CH$_2$O)$_3$CH$_3$, NH$_2$] | 3-cyano-4-methyl-6-hydroxy-1-phenyl-2-pyridone |
| 23 | 2-amino-benzoic acid di(ethyleneglycol)monomethyl ether ester [COO(CH$_2$CH$_2$O)$_2$CH$_3$, NH$_2$] | 3-cyano-4-methyl-6-hydroxy-1-(2-hydroxyethyl)-2-pyridone |
| 24 | 2-amino-benzoic acid 4-hydroxybutyl ester [COO(CH$_2$)$_3$CH$_2$OH, NH$_2$] | 3-cyano-4-methyl-6-hydroxy-1-n-butyl-2-pyridone |
| 25 | " | 3-cyano-4-methyl-6-hydroxy-1-(3-methoxypropyl)-2-pyridone |
| 26 | 2-amino-benzoic acid 6-hydroxyhexyl ester [COO(CH$_2$)$_5$CH$_2$OH, NH$_2$] | 3-cyano-4-methyl-6-hydroxy-1-(2-hydroxyethyl)-2-pyridone |
| 27 | " | 3-cyano-4-methyl-6-hydroxy-1-methyl-2-pyridone |

-continued

| Example | Diazo component | Coupling component |
|---|---|---|
| 28 | 3-aminobenzoic acid butyl ester (COOC$_4$H$_9$, NH$_2$ meta) | 1-(3-methoxypropyl)-2-hydroxy-4-methyl-6-oxo-3-cyano-1,6-dihydropyridine |
| 29 | " | 1-(2-methoxyethyl)-2-hydroxy-4-methyl-6-oxo-3-cyano-1,6-dihydropyridine |
| 30 | 2-amino-benzoic acid 2-(2-hydroxyethoxy)ethyl ester (COOCH$_2$CH$_2$OCH$_2$CH$_2$OH) | 1-butyl-2-hydroxy-4-methyl-6-oxo-3-cyano-1,6-dihydropyridine |
| 31 | 3-amino-benzoic acid 2-(2-methoxyethoxy)ethyl ester (COO(CH$_2$CH$_2$O)$_2$CH$_3$) | 1-(3-methoxypropyl)-2-hydroxy-4-methyl-6-oxo-3-cyano-1,6-dihydropyridine |
| 32 | 4-amino-benzoic acid cyclohexyl ester | 1-methyl-2-hydroxy-4-methyl-6-oxo-3-cyano-1,6-dihydropyridine |
| 33 | " | 1-butyl-2-hydroxy-4-methyl-6-oxo-3-cyano-1,6-dihydropyridine |
| 34 | " | 1-(3-methoxypropyl)-2-hydroxy-4-methyl-6-oxo-3-cyano-1,6-dihydropyridine |
| 35 | CH$_3$O(CH$_2$CH$_2$O)$_2$OC—C$_6$H$_4$—NH$_2$ | 1-(n-butyl)-2-hydroxy-4-methyl-6-oxo-3-cyano-1,6-dihydropyridine |
| 36 | CH$_3$COOCH$_2$CH$_2$OOC—C$_6$H$_4$—NH$_2$ | 1-methyl-2-hydroxy-4-methyl-6-oxo-3-cyano-1,6-dihydropyridine |

| Example | Diazo component | Coupling component |
|---|---|---|
| 37 | " |  |
| 38 | 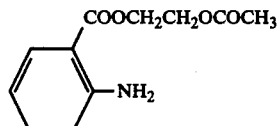 | " |
| 39 | 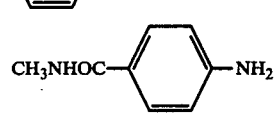 | 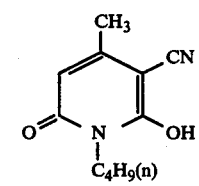 |
| 40 | 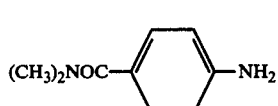 | |
| 41 | 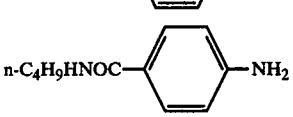 | 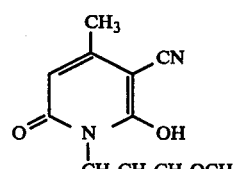 |
| 42 | 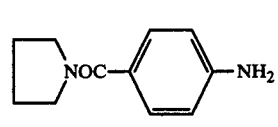 | 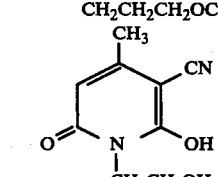 |
| 43 | 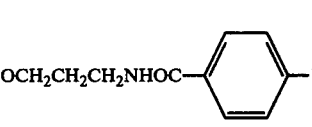 | 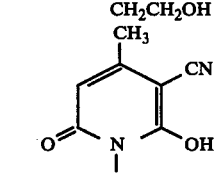 |
| 44 | " | 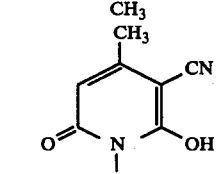 |
| 45 | " | 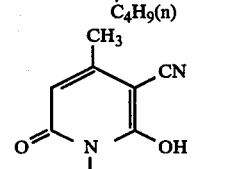 |
| 46 | 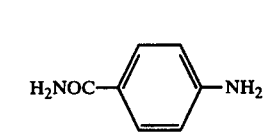 | 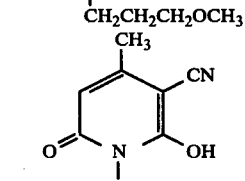 |
| 47 | 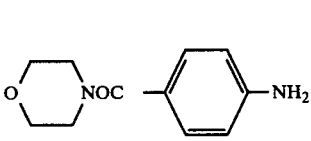 | |

4,133,806

-continued

| Example | Diazo component | Coupling component |
|---|---|---|
| 48 | $H_9C_4-\underset{\underset{C_2H_5}{|}}{CH}-CH_2-NHCO-\phantom{X}-NH_2$ | " |
| 49 | " | (4-methyl-3-cyano-6-hydroxy-1-ethyl-2-pyridone) |
| 50 | " | (4-methyl-3-cyano-6-hydroxy-1-(2-methoxyethyl)-2-pyridone) |
| 51 | " | (4-methyl-3-cyano-6-hydroxy-1-(3-hydroxypropyl)-2-pyridone) |
| 52 | " | (4-methyl-3-cyano-6-hydroxy-1-(2-hydroxypropyl)-2-pyridone; CH₂—CHOHCH₃) |
| 53 | cyclohexyl-NHCO-⟨⟩-NH₂ | (4-methyl-3-cyano-6-hydroxy-1-(3-ethoxypropyl)-2-pyridone) |
| 54 | " | (4-methyl-3-cyano-6-hydroxy-1-(3-methoxypropyl)-2-pyridone) |
| 55 | " | (4-methyl-3-cyano-6-hydroxy-1-(2-hydroxyethyl)-2-pyridone) |
| 56 | " | (4-methyl-3-cyano-6-hydroxy-1-n-butyl-2-pyridone) |

-continued

| Example | Diazo component | Coupling component |
|---|---|---|
| 57 | H₃C—(CH₂)₅—NHCO—C₆H₄—NH₂ | 4-methyl-3-cyano-6-hydroxy-2-oxo-1-phenyl-pyridine (CH₃, CN, OH, =O, N-C₆H₅) |
| 58 | " | same pyridine with N-CH₂CH₂OH |
| 59 | " | same pyridine with N-C₄H₉(i) |
| 60 | " | same pyridine with N-CH₂CH₂CH₂OCH₃ |
| 61 | " | same pyridine with N-CH₃ |
| 62 | " | same pyridine with N-C₂H₅ |
| 63 | H₅C₂CH₂CH₂CH₂NHCO—C₆H₄—NH₂ | same pyridine with N-C₆H₅ |
| 64 | " | same pyridine with N-C₄H₉(n) |
| 65 | H₃C(CH₂)₇NHCO—C₆H₄—NH₂ | same pyridine with N-CH₃ |

-continued
| Example | Diazo component | Coupling component |
|---|---|---|
| 66 | " | 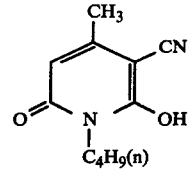 |
| 67 | " | 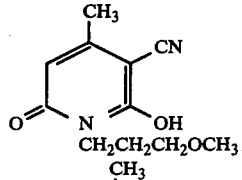 |
| 68 | " |  |
| 69 | 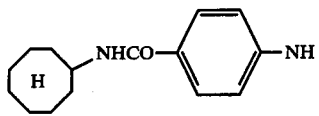 | 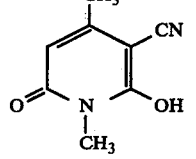 |
| 70 | " | 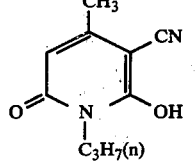 |
| 71 | " | 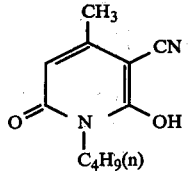 |
| 72 | " | 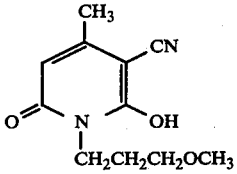 |
| 73 | " | 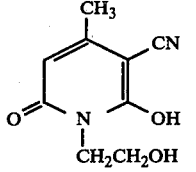 |
| 74 | " | 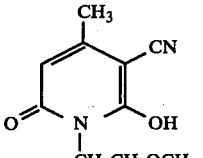 |
| 75 | 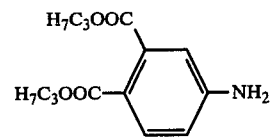 | 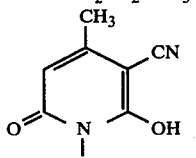 |

-continued

| Example | Diazo component | Coupling component |
|---|---|---|
| 76 | H₃COCH₂CH₂OOC—⟨benzene⟩(—NH₂)—COOCH₂CH₂OCH₃ | " |
| 77 | ⟨benzene⟩ with COOC₄H₉ (ortho), NH₂, COOC₄H₉ | 4-methyl-3-cyano-6-oxo-2-hydroxy-N-methyl-pyridone |

EXAMPLE 78

21.2 Parts of p-aminobenzanilide is stirred at room temperature for several hours with 300 parts by volume of water and 0.3 part of the reaction product of oleylamine with about 12 moles of ethylene oxide. 25 parts by volume of concentrated hydrochloric acid and 300 parts of ice are added and then 30 parts by volume of 23% sodium nitrite solution is allowed to flow in slowly at 0° C. to 5° C. The whole is stirred for another two hours and any excess of nitrous acid present is removed by adding sulfamic acid. Coupling onto 22.9 parts of N-methyl-2-hydroxy-3-cyano-4-methyl-pyridone-(6) is carried out by a method analogous to that described in Example 1. A yellow dye is obtained having the formula:

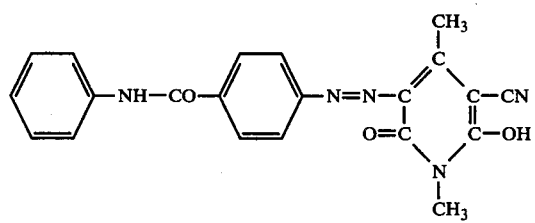

which dissolves in dimethylformamide giving a brown color and dyes polyethylene terephthalate cloth orange shades having excellent fastness properties.

Dyes having similar fastness properties are obtained by an analogous method with the diazo components and coupling components set out in the following Table. The shade of the dyeing on polyesters is greenish yellow in Example 79 and yellow in Examples 80 to 84.

| Example | Diazo component | Coupling component |
|---|---|---|
| 79 | phthalimide (N-C₄H₉(n)) with NH₂ substituent | CH₃, CN, OH, pyridone with N—CH₂CH₂CH₂OCH₃ |
| 80 | phthalimide (N-C₄H₉(n)) with NH₂ substituent (para) | " |
| 81 | n-C₃H₇OOC—⟨benzene⟩(NH₂)—COOC₃H₇-n | CH₃, CN, OH, pyridone with N—CH₂CH₂CH₂OCH₃ |
| 82 | ⟨C₆H₅⟩—NHOC—⟨C₆H₄⟩—NH₂ | CH₃, CN, OH, pyridone with N—CH₂CH₂OH |

-continued

| Example | Diazo component | Coupling component |
|---|---|---|
| 83 | H₃C(CH₂)₄NHCO—C₆H₄—NH₂ | 1,4-disubstituted pyridone with CH₃, CN, OH, =O, N-CH₂CH₂CH₂OCH₃ |
| 84 | " | 1,4-disubstituted pyridone with CH₃, CN, OH, =O, N-CH₃ |

EXAMPLE 85

109 Parts of p-aminobenzoic cyclohexylamide is stirred with 2000 parts of water and 140 parts of concentrated hydrochloric acid. Two hours later 500 parts of ice is added. 156 parts of 23% sodium nitrite solution is then added to the suspension at 0° to 5° C. in the course of thirty minutes. The whole is stirred for two hours and the solution is allowed to flow through a filter within thirty minutes into a solution of 84 parts of 1,4-dimethyl-2-hydroxy-3-cyanopyridone-(6) in 1500 parts of water and 42 parts of 50% caustic soda solution. 45 parts of sodium carbonate and 1000 parts of ice are then added. The temperature should be 4° to 8° C. during coupling; the pH is from 7 to 8. The whole is stirred overnight and the dye is suction filtered and washed with 2000 parts of water.

200 Parts of the dye having the formula:

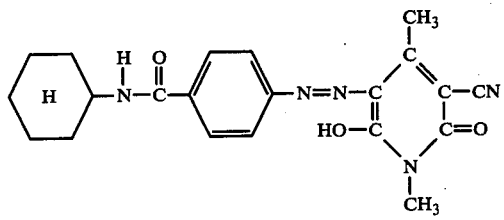

is obtained.

EXAMPLE 86

124 Parts of p-aminobenzoic isooctylamide is stirred with 1450 parts of water and 140 parts of concentrated hydrochloric acid. 500 parts of ice is added and then 36 parts of 23% sodium nitrite solution at 0° to 5° C. within half an hour and the whole is stirred for another two hours. The diazo solution is allowed to flow through a filter into a solution of 84 parts of 1,4-dimethyl-2-hydroxy-3-cyanopyridone-(6) in 1500 parts of water, 42 parts of sodium carbonate and 1000 parts of ice. The temperature of the reaction mixture should be 4° to 8° C. during the coupling; the pH is 7 to 8.

The whole is stirred overnight and the dye is then suction filtered, washed and dried. 210 parts of the dye having the formula:

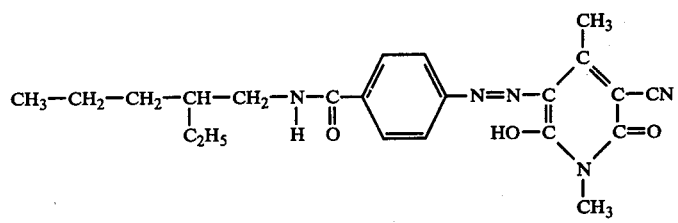

is obtained.

EXAMPLE 87

30 Parts by volume of 23% aqueous sodium nitrite solution is allowed to flow slowly at 3° to 8° C. into a solution of 24 parts of 2-amino-5-nitrobenzoic (β-methoxyethyl) ester in 300 parts by volume of glacial acetic acid and 25 parts by volume of concentrated hydrochloric acid. During the addition of the sodium nitrite solution, a small amount of ice is added. The solution is freed from excess nitrous acid by adding sulfamic acid, and is allowed to flow slowly into a sol solution of 22.9 parts of N-methyl-2-hydroxy-3-cyano-4-methylpyridone-(6), 5 parts of sodium hydroxide and 10 parts of sodium carbonate in 300 parts by volume of water, a pH of 7 to 8 and a temperature of 0° to 5° C. being maintained by simultaneous addition of 0° to 5° C. being maintained by simultaneous addition of 50% caustic soda solution and 1000 parts of ice. The whole is stirred overnight. The coupling product is suction filtered, washed with water and dried. The dye having the formula:

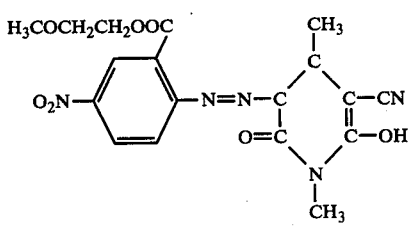

is obtained as a yellow powder which dissolves in dimethylformamide with a yellow brown color and gives greenish yellow dyeings having very good fastness properties on polyester fibers.

Other dyes having similar properties are obtained by using the compounds set out in the following Table. In each case the shade of the dyeing on polyesters is greenish yellow.

| Example | Diazo component | Coupling component |
|---|---|---|
| 88 | 2-amino-5-nitrobenzoic acid propyl ester ($O_2N$-, -$COOC_3H_7$, -$NH_2$ on benzene) | 1-methyl-3-cyano-4-methyl-6-hydroxy-2-oxo-pyridine (CH_3, CN, OH, =O, N-CH_3) |
| 89 | 2-amino-5-nitrobenzoic acid isobutyl ester ($O_2N$-, -$COOC_4H_9(i)$, -$NH_2$ on benzene) | (CH_3, CN, OH, =O, N-CH_2CH_2CH_2OCH_3) |
| 90 | 2-aminophenyl benzyl ketone (-$NH_2$, -$COCH_2C_6H_5$ on benzene) | " |
| 91 | 4-(n-butylcarbonylamino)aniline ($H_3C(CH_2)_3NHCO$-, -$NH_2$) | (CH_3, CN, OH, =O, N-CH_2-C_6H_5) |
| 92 | 2-aminophenyl phenyl ester (-$NH_2$, -$COOC_6H_5$) | (CH_3, CN, OH, =O, N-C_4H_9(n)) |
| 93 | $H_3C(CH_2)_3NHCO$-, -$NH_2$ | (CH_3, CN, OH, =O, N-C_6H_4-OCH_3) |
| 94 | $H_3C(CH_2)_3NHCO$-, -$NH_2$ | (CH_3, CN, OH, =O, N-C_6H_4-Cl) |
| 95 | " | (CH_3, OH, OH, =O, N-CH_2CH_2C_6H_5) |

| Example | Diazo component | Coupling component |
|---|---|---|
| 96 | " | 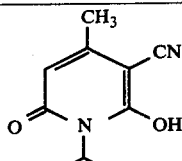 |
| 97 | " | 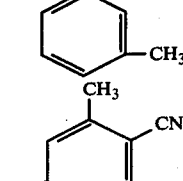 |

EXAMPLE 98

100 Parts of polyethylene terephthalate cloth is treated for ninety minutes at a temperature of 100° C. in a dye liquor consisting of 3000 parts of water, 9 parts of finely divided o-phenylphenol and 0.3 part of the dye from Example 86. The greenish yellow dyed cloth is then washed with water, then given a reductive purification in a liquor consisting of 3000 parts of water, 3 parts of sodium dithionite and 3 parts of 32% caustic soda solution for fifteen minutes at 35° C., washed again with water and dried.

EXAMPLE 99

100 Parts of a secondary cellulose acetate cloth is dyed for sixty minutes at 80° C. in a liquor consisting of 3000 parts of water, 1.5 parts of the dye from Example 41 and 3 parts of the reaction product of 1 mole of castor oil and 40 moles of ethylene oxide. The greenish yellow dyeing obtained has outstanding light fastness and good fastness to washing.

I claim:

1. An azo dye of the formula

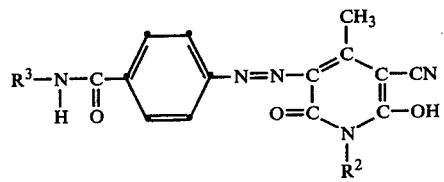

wherein:
R² is alkyl of 1 to 4 carbon atoms or is ethyl or propyl substituted by hydroxy, methoxy, ethoxy, propoxy or butoxy; and R³ is $C_4H_9-$, $CH_3OCH_2CH_2-CH_2-$, $CH_3(CH_2)_4-$, $CH_3(CH_2)_5-$, $CH_3(CH_2)_7-$,

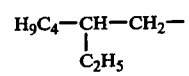

or cycloalkyl of 5 to 8 carbon atoms.

2. The dye of the formula

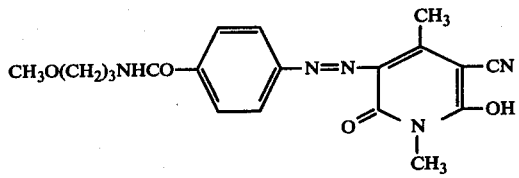

3. The dye of the formula

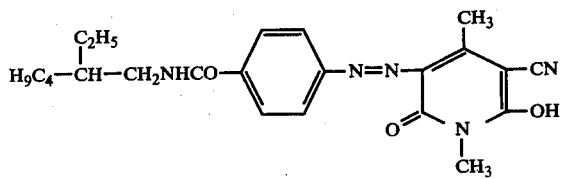

4. The dye of the formula

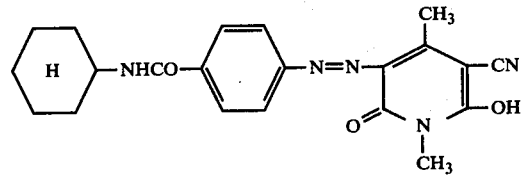

* * * * *